United States Patent
Sakoh et al.

(10) Patent No.: US 11,352,378 B2
(45) Date of Patent: Jun. 7, 2022

(54) LIPOPHILIC GROUP-CONTAINING ORGANOSILANE COMPOUND, SURFACE TREATMENT AGENT AND ARTICLE

(71) Applicant: SHIN-ETSU CHEMICAL CO., LTD., Tokyo (JP)

(72) Inventors: Ryusuke Sakoh, Annaka (JP); Seiya Mori, Annaka (JP); Takashi Matsuda, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/649,834

(22) PCT Filed: Sep. 26, 2018

(86) PCT No.: PCT/JP2018/035677
§ 371 (c)(1),
(2) Date: Mar. 23, 2020

(87) PCT Pub. No.: WO2019/082583
PCT Pub. Date: May 2, 2019

(65) Prior Publication Data
US 2020/0283458 A1  Sep. 10, 2020

(30) Foreign Application Priority Data
Oct. 26, 2017  (JP) .............................. JP2017-206986

(51) Int. Cl.
*C07F 7/18* (2006.01)
*C09D 183/04* (2006.01)

(52) U.S. Cl.
CPC .......... *C07F 7/1876* (2013.01); *C09D 183/04* (2013.01)

(58) Field of Classification Search
CPC .............................. C07F 7/1876; C09D 183/04
See application file for complete search history.

(56) References Cited

U.S. PATENT DOCUMENTS

| | | |
|---|---|---|
| 2009/0208728 A1 | 8/2009 | Itami et al. |
| 2009/0216035 A1 | 8/2009 | Itami et al. |
| 2012/0077041 A1 | 3/2012 | Yamane et al. |
| 2013/0136928 A1 | 5/2013 | Yamane et al. |
| 2013/0303689 A1 | 11/2013 | Sato et al. |
| 2015/0099441 A1* | 4/2015 | Le Paih ................ A22C 11/105 452/48 |
| 2015/0274889 A1 | 10/2015 | Sakoh et al. |
| 2016/0319078 A1 | 11/2016 | Ozai et al. |
| 2020/0369887 A1* | 11/2020 | Mori ................... C08G 77/045 |

FOREIGN PATENT DOCUMENTS

| | | | |
|---|---|---|---|
| JP | 2001-353808 A | 12/2001 | |
| JP | 2007-211137 A | 8/2007 | |
| JP | 2007-224089 A | 9/2007 | |
| JP | 2008-534696 A | 8/2008 | |
| JP | 2008-537557 A | 9/2008 | |
| JP | 2012-72272 A | 4/2012 | |
| JP | 2012-157856 A | 8/2012 | |
| JP | 2013-136833 A | 7/2013 | |
| JP | 2015-147879 A | 8/2015 | |
| JP | 2015201257 | * 10/2015 | ............... C09K 3/18 |
| JP | 2015-199906 A | 11/2015 | |
| WO | WO 2017/061235 A1 | 3/2017 | |
| WO | WO-2017061235 A1 * | 4/2017 | ............... C09K 3/18 |

OTHER PUBLICATIONS

CAS Registry No. 2184976-89-2 (Mar. 5, 2018) (Year: 2018).*
CAS Abstract Y. Yamane et al., WO 2017/061235 (2017) (Year: 2017).*
English-Language Translation of Yamane et al., WO 2017/061235 (2017) (Year: 2017).*
CAS Registry No. 2093364-84-0 (Apr. 27, 2017) (Year: 2017).*
International Search Report, issued in PCT/JP2018/035677, PCT/ISA/210, dated Dec. 25, 2018.
Written Opinion of the International Searching Authority, issued in PCT/JP2018/035677, PCT/ISA/237, dated Dec. 25, 2018.

\* cited by examiner

*Primary Examiner* — Alexander R Pagano
(74) *Attorney, Agent, or Firm* — Birch, Stewart, Kolasch & Birch, LLP

(57) ABSTRACT

By using this organosilane compound represented by formula (1), a surface treatment agent that contains said (hydrolyzable) organosilane compound and/or a partial (hydrolysis) condensate thereof can form a cured film which exhibits excellent lipophilic properties and has a refractive index similar to the refractive index of sebum.

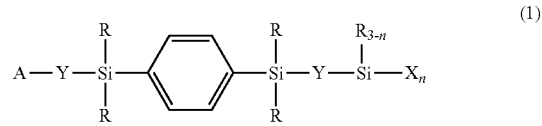

(A is any one of $-C(=O)OR^1$, $-C(=O)NR^1_2$, $-C(=O)SR^1$ and $-P(=O)(OR^1)_2$; $R^1$ is a hydrogen atom, an alkyl group, an aryl group or an aralkyl group; Y is a divalent organic group; R is an alkyl group or a phenyl group; X is a hydroxyl group or a hydrolyzable group; and n is 1-3.)

41 Claims, No Drawings

LIPOPHILIC GROUP-CONTAINING ORGANOSILANE COMPOUND, SURFACE TREATMENT AGENT AND ARTICLE

TECHNICAL FIELD

This invention relates to an organosilane compound containing a hydroxyl or hydrolyzable group and a lipophilic group in the molecule, and more particularly, to a lipophilic group-containing (hydrolyzable) organosilane compound capable of forming a lipophilic coating, a surface treating agent comprising the (hydrolyzable) organosilane compound and/or a partial (hydrolytic) condensate thereof, and an article which is surface-treated with the surface treating agent, i.e., has a cured film of the surface treating agent on its surface.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an annually increasing need for technology to attain fingerprint proofness or easy stain removal on a display surface for better appearance or visibility. It is thus desired to have a material capable of meeting these requirements. In particular, for touch panel displays which are readily stained with fingerprints, it is desirable to form an oil repellent or lipophilic layer on their surface.

In general, silane coupling agents are well known for their ability to bond surfaces of glass or fabric substrates to organic compounds. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. Since the hydrolyzable silyl groups form chemical and physical bonds with the surface of glass or metal, the coating becomes a tough coating having durability.

Patent Documents 1 to 6 (JP-A 2008-534696, JP-A 2008-537557, JP-A 2012-072272, JP-A 2012-157856, JP-A 2013-136833, JP-A 2015-199906) disclose many compositions comprising a fluoropolyether-containing polymer which is obtained by introducing a hydrolyzable silyl group into a fluoropolyether-containing compound, the composition being tightly adherent to a substrate surface and capable of forming a coating with water/oil repellency, antifouling and other properties on the substrate surface.

Although the conventional oil repellent layer formed using a fluoropolyether-containing polymer is oil repellent and easy to wipe off stains, one problem is that once fingerprints are put on, the fingerprints look conspicuous because the sebum scatters light.

Also, Patent Document 7 (JP-A 2001-353808) discloses a composition comprising a silane compound obtained by introducing a hydrolyzable silyl group into a lipophilic compound, the composition being tightly adherent to a substrate surface and forming a lipophilic coating thereon.

However, the refractive index of the silane compound described in Patent Document 7 is far apart from the refractive index ~1.5 of sebum. Then a coating of the silane compound makes fingerprints inconspicuous, but fails in rendering fingerprints substantially invisible.

PRIOR ART DOCUMENTS

Patent Documents

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833
Patent Document 6: JP-A 2015-199906
Patent Document 7: JP-A 2001-353808

SUMMARY OF INVENTION

Technical Problem

An object of the invention, which has been made under the above-mentioned circumstances, is to provide a lipophilic group-containing (hydrolyzable) organosilane compound, a surface treating agent comprising the (hydrolyzable) organosilane compound and/or a partial (hydrolytic) condensate thereof, and an article which is surface-treated with the surface treating agent, the organosilane compound being capable of forming a fully lipophilic cured film which has a refractive index close to the refractive index ~1.5 of sebum so that even when fingerprints are put thereon, the film is effective for preventing the sebum from scattering light and for making the fingerprints inconspicuous, i.e., rendering the fingerprints substantially invisible.

Solution to Problem

Making extensive investigations to attain the above object, the inventors have found that when a (hydrolyzable) organosilane compound containing a hydroxyl group or hydrolyzable group and a lipophilic group, of specific molecular structure having the general formula (1), shown below, especially a (hydrolyzable) organosilane compound containing a hydroxyl group or hydrolyzable group and a lipophilic group, having the general formula (2), shown below, is used as the lipophilic group-containing (hydrolyzable) organosilane compound, a surface treating agent comprising the (hydrolyzable) organosilane compound and/or a partial (hydrolytic) condensate thereof is able to form a fully lipophilic cured film which has a refractive index close to the refractive index of sebum. The present invention is predicated on this finding.

Accordingly, the invention provides a lipophilic group-containing (hydrolyzable) organosilane compound, a surface treating agent, and an article, as defined below.

1. An organosilane compound having the general formula (1):

[Chem. 1]

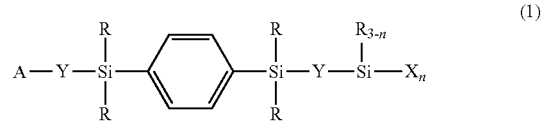

wherein A is —C(=O)OR$^1$, —C(=O)NR$^1{}_2$, —C(=O)SR$^1$, or —P(=O)(OR$^1$)$_2$, R$^1$ is hydrogen, a C$_1$-C$_{30}$ alkyl group, $C_6$-$C_{30}$ aryl group or $C_7$-$C_{30}$ aralkyl group, Y is independently a divalent organic group, R is a $C_1$-$C_4$ alkyl group or phenyl group, X is independently a hydroxyl group or hydrolyzable group, and n is an integer of 1 to 3.

2. The organosilane compound of 1 wherein in formula (1), Y is a $C_2$-$C_{30}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is $C_1$-$C_4$ alkyl or phenyl, and which may contain a $C_6$-$C_{20}$ arylene group.

3. The organosilane compound of 1 or 2 wherein in formula (1), X is each independently selected from the group consisting of hydroxyl, $C_1$-$C_{10}$ alkoxy, $C_2$-$C_{10}$ alkoxy-substituted alkoxy, $C_1$-$C_{10}$ acyloxy, $C_2$-$C_{10}$ alkenyloxy, halogen, oxime, isocyanate, and cyanate.

4. The organosilane compound of any one of 1 to 3, having the formula (2):

[Chem. 2]

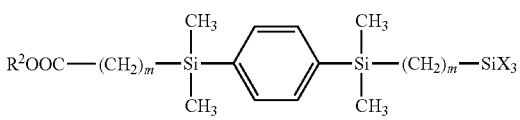

(2)

wherein $R^2$ is a $C_1$-$C_{20}$ alkyl group, $C_6$-$C_{20}$ aryl group or $C_7$-$C_{20}$ aralkyl group, m is each independently an integer of 2 to 20, and X is independently a hydroxyl group or hydrolyzable group.

5. The organosilane compound of any one of 1 to 4, having a refractive index of at least 1.45.

6. A surface treating agent comprising at least one organosilane compound of any one of 1 to 5 and/or a partial (hydrolytic) condensate thereof.

7. The surface treating agent of 6, further comprising a solvent.

8. The surface treating agent of 6 or 7, further comprising a hydrolytic condensation catalyst.

9. The surface treating agent of any one of 6 to 8, which cures into a film having a contact angle with oleic acid of up to 30° at 25° C. and relative humidity 40%.

10. The surface treating agent of any one of 6 to 9, which cures into a film having a haze of up to 10 when sebum is deposited to the cured film under a load of 1 kg.

11. An article having on its surface a cured film of the surface treating agent of any one of 6 to 10.

12. In conjunction with the step of forming a cured film of the surface treating agent of any one of 6 to 10 on a surface of a substrate, a method of providing the substrate surface with a refractive index of 1.45 to 1.52 as measured according to JIS K 0062.

Advantageous Effects of Invention

The lipophilic group-containing (hydrolyzable) organosilane compound of the invention has advantages that due to a lipophilic end group in the molecule, when sebum is attached to a substrate, the cured film allows the sebum to be wetted and spread over the substrate, and that due to a phenylene group in the molecule, the refractive index of the cured film at its surface is close to the refractive index (~1.5) of sebum. The article which is surface treated with a surface treating agent comprising the lipophilic group-containing (hydrolyzable) organosilane compound and/or a partial (hydrolytic) condensate thereof has a refractive index at its surface of at least 1.45, especially 1.45 to 1.52 as measured according to JIS K 0062, indicating substantial fingerprint invisibility.

DESCRIPTION OF EMBODIMENTS

The invention provides a (hydrolyzable) organosilane compound containing a lipophilic group in the molecule, represented by the general formula (1). A mixture of such compounds is acceptable.

[Chem. 3]

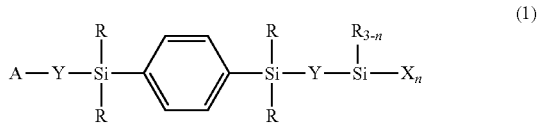

(1)

Herein "A" is —C(=O)$OR^1$, —C(=O)$NR^1_2$, —C(=O)$SR^1$, or —P(=O)$(OR^1)_2$, $R^1$ is hydrogen, a $C_1$-$C_{30}$ alkyl group, $C_6$-$C_{30}$ aryl group or $C_7$-$C_{30}$ aralkyl group, Y is independently a divalent organic group, R is independently a $C_1$-$C_4$ alkyl group or phenyl group, X is independently a hydroxyl group or hydrolyzable group, and n is an integer of 1 to 3.

The lipophilic group-containing (hydrolyzable) organosilane compound has the structure that a lipophilic end group is linked to a hydrolyzable silyl group such as alkoxysilyl or hydroxyl-containing silyl group via a linking group or silphenylene group. It is characterized by substrate adhesion and lipophilicity.

In formula (1), "A" is a carboxylate or carboxylic acid of the formula: —C(=O)$OR^1$, amide of the formula: —C(=O)$NR^1_2$, thio-ester or thio-acid of the formula: —C(=O)$SR^1$, or phosphonate or phosphonic acid of the formula: —P(=O)$(OR^1)_2$, that is, a lipophilic end group according to the invention.

Herein, $R^1$ is hydrogen, a $C_1$-$C_{30}$ alkyl group, $C_6$-$C_{30}$ aryl group or $C_7$-$C_{30}$ aralkyl group. The alkyl group may be straight, branched or cyclic, or a combination thereof, and is preferably $C_1$-$C_8$ straight alkyl, more preferably $C_2$-$C_4$ straight alkyl group.

Examples of $R^1$ include hydrogen, alkyl groups such as methyl, ethyl, propyl, butyl, pentyl, hexyl, heptyl, octyl, nonyl, decyl, dodecyl, tetradecyl, hexadecyl, octadecyl, isopropyl, isobutyl, tert-butyl, neopentyl, thexyl, cyclopentyl, cyclohexyl, cycloheptyl, cyclohexylmethyl, norbornyl, decahydronaphthyl, adamantyl, and adamantylmethyl; aryl groups such as phenyl, tolyl, and naphthyl; and aralkyl groups such as benzyl, phenylethyl, and phenylpropyl. $R^1$ is preferably ethyl or octyl.

Examples of "A" are shown below.

[Chem. 4]

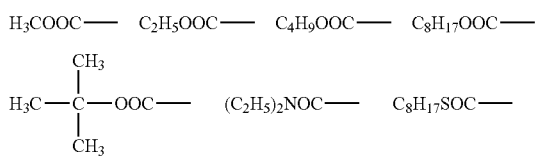

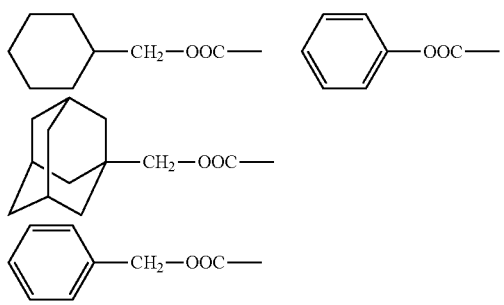

In formula (1), X which may be different from each other is a hydroxyl or hydrolyzable group. Examples of X include hydroxyl, $C_1$-$C_{10}$ alkoxy groups such as methoxy, ethoxy, propoxy, isopropoxy, and butoxy, $C_2$-$C_{10}$ alkoxy-substituted alkoxy groups such as methoxymethoxy and methoxyethoxy, $C_1$-$C_{10}$ acyloxy groups such as acetoxy, $C_2$-$C_{10}$ alkenyloxy groups such as isopropenoxy, halogen atoms such as fluorine, chlorine, bromine and iodine, oxime, isocyanate, and cyanate. Inter alia, methoxy, ethoxy, isopropenoxy and chlorine are preferred.

In formula (1), R is a $C_1$-$C_4$ alkyl group such as methyl, ethyl, propyl, isopropyl, butyl, isobutyl, sec-butyl, or tert-butyl, or phenyl, with methyl being preferred. The subscript n is an integer of 1 to 3, preferably 2 or 3, most preferably 3 as viewed from reactivity and substrate adhesion.

In formula (1), Y is a divalent organic group or linking group between "A" group and silphenylene group. Preferably Y is a $C_2$-$C_{30}$, especially $C_2$-$C_{20}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is as defined above, and which may contain a $C_6$-$C_{20}$ arylene group. More preferably Y is a divalent group having the formula (3).

$$-R^3-Z-(R^3)_a- \quad (3)$$

In formula (3), $R^3$ is independently a divalent hydrocarbon group. Examples include $C_2$-$C_{30}$ alkylene groups such as ethylene, propylene, butylene and hexamethylene, and $C_7$-$C_{30}$ alkylene groups containing a $C_6$-$C_{20}$ arylene group such as phenylene, with $C_2$-$C_{20}$ alkylene groups being preferred.

In formula (3), Z is a single bond, or a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, preferably 2 to 5 silicon atoms, wherein R is as defined above.

Examples of the silalkylene and silarylene groups are shown by the following formula.

[Chem. 6]

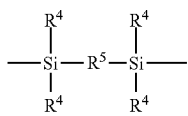

Herein $R^4$ which may be the same or different is a $C_1$-$C_4$ alkyl group such as methyl, ethyl, propyl or butyl, or $C_6$-$C_{10}$ aryl group such as phenyl. $R^5$ is a $C_1$-$C_4$ alkylene group such as methylene, ethylene, or propylene (trimethylene or methylethylene) or $C_6$-$C_{10}$ arylene group such as phenylene.

Examples of the straight, branched or cyclic divalent organopolysiloxane residue of 2 to 10 silicon atoms, preferably 2 to 5 silicon atoms, are shown by the following formulae.

[Chem.7]

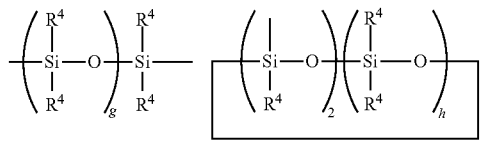

Herein $R^4$ is as defined above, g is an integer of 1 to 9, preferably 1 to 4, and h is an integer of 1 to 8, preferably 1 to 3.

In formula (3), "a" is 0 or 1.

Exemplary of Y are the following groups.

[Chem. 8]

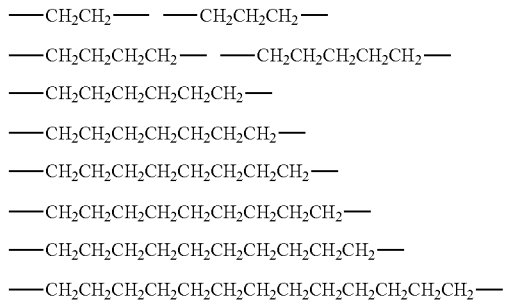

[Chem. 9]

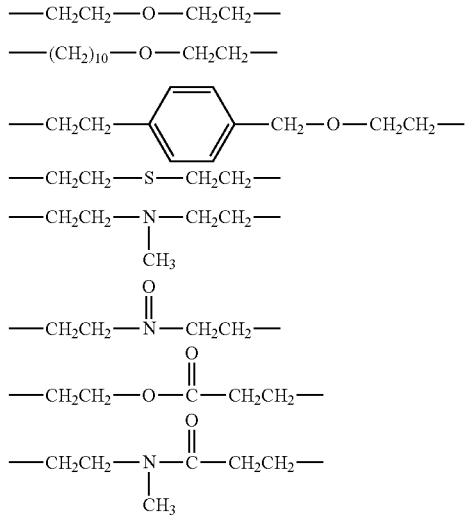

[Chem. 10]
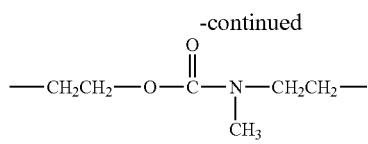
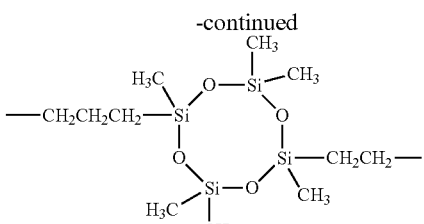
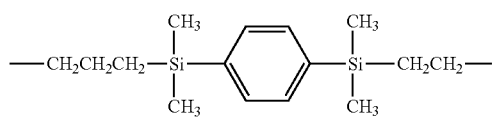
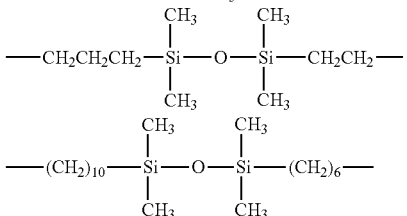
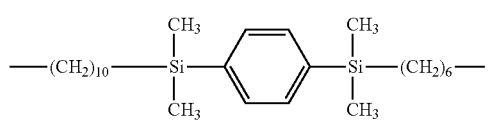
Exemplary of the lipophilic group-containing (hydrolyzable) organosilane compound having formula (1) are compounds of the following formulae.
[Chem. 11]
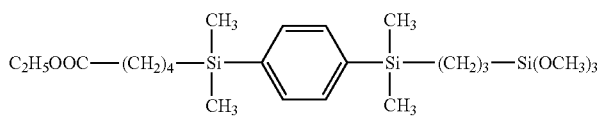
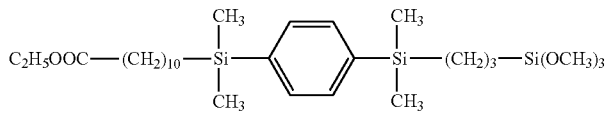
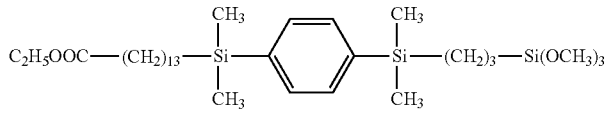
[Chem. 12]
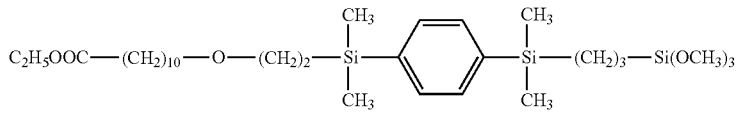
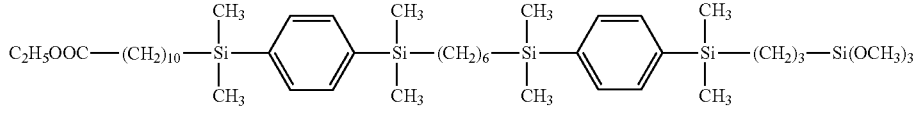
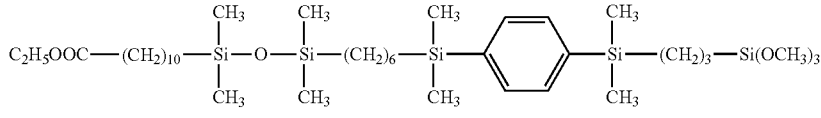
[Chem. 13]
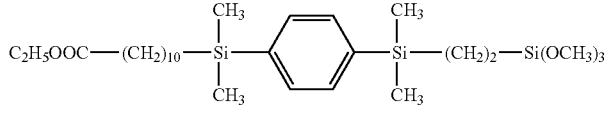
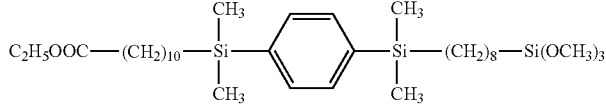

-continued

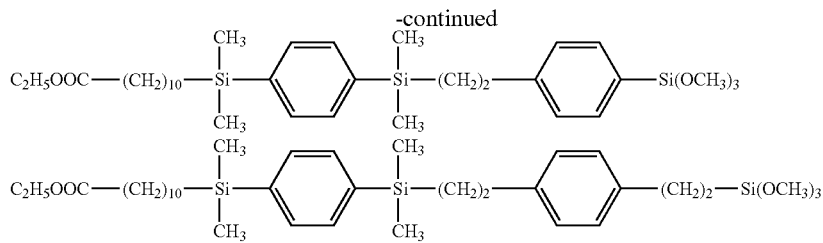

[Chem. 14]

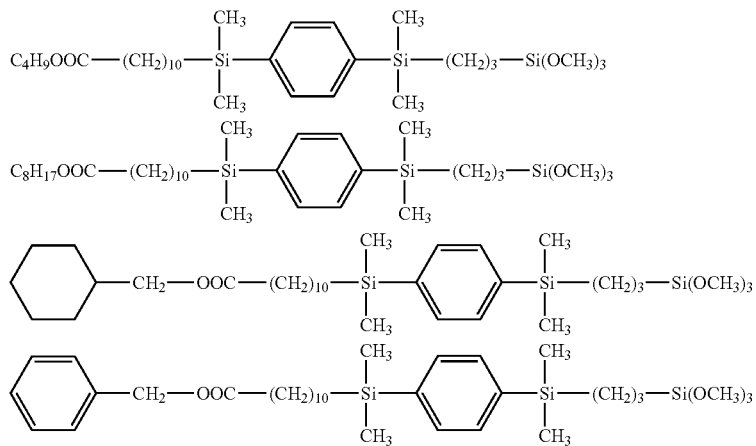

[Chem. 15]

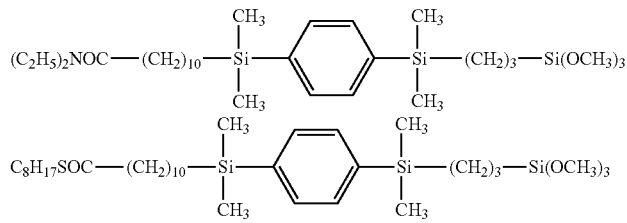

Of the lipophilic group-containing (hydrolyzable) organosilane compounds, those compounds having the general formula (2) are more preferred.

[Chem. 16]

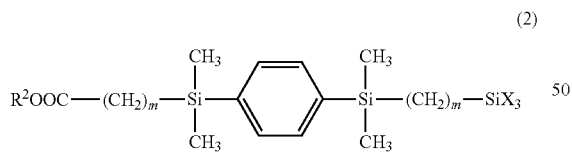

Herein $R^2$ is a $C_1$-$C_{20}$ alkyl group, $C_6$-$C_{20}$ aryl group or $C_7$-$C_{20}$ aralkyl group, m is each independently an integer of 2 to 20, preferably 3 to 10, and X is as defined above.

In formula (2), $R^2$ is a $C_1$-$C_{20}$ alkyl group, $C_6$-$C_{20}$ aryl group or $C_7$-$C_{20}$ aralkyl group, preferably a $C_1$-$C_8$ straight alkyl group, more preferably a $C_2$-$C_4$ straight alkyl group.

Examples of $R^2$ include alkyl groups such as methyl, ethyl, propyl, butyl, pentyl, hexyl, heptyl, octyl, nonyl, decyl, dodecyl, tetradecyl, hexadecyl, octadecyl, isopropyl, isobutyl, tert-butyl, neopentyl, thexyl, cyclopentyl, cyclohexyl, cycloheptyl, cyclohexylmethyl, norbornyl, decahydronaphthyl, adamantyl, and adamantylmethyl; aryl groups such as phenyl, tolyl, and naphthyl; and aralkyl groups such as benzyl, phenylethyl, and phenylpropyl. $R^2$ is preferably ethyl or octyl.

Exemplary of the lipophilic group-containing (hydrolyzable) organosilane compound having formula (2) are compounds of the following formulae.

[Chem. 17]

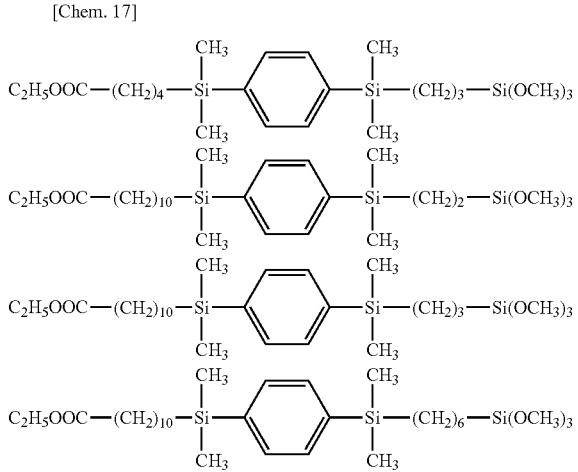

-continued

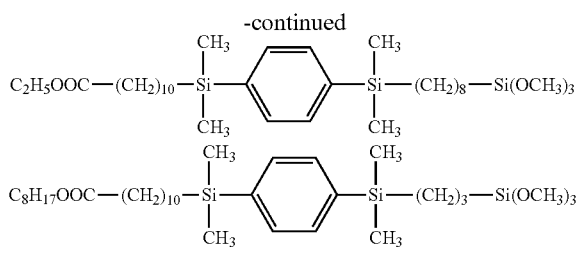

The method for preparing the lipophilic group-containing (hydrolyzable) organosilane compound having formula (1), especially the lipophilic group-containing (hydrolyzable) organosilane compound having formula (1) wherein Y is each independently a $C_2$-$C_{30}$ alkylene group and R is methyl is exemplified by the following method.

First, a silane compound having "A" in formula (1) and phenyldimethylsilyl site at ends of the molecular chain (for example, dimethylsilane having "A" in formula (1) and dimethylhydrogensilylphenyl as silicon-bonded substituents) is heated and stirred at a temperature of 40 to 120° C., preferably 60 to 100° C., most preferably about 80° C., after which a hydrosilylation catalyst, for example, toluene solution of chloroplatinic acid/vinylsiloxane complex is added. Subsequently, a compound having a hydrolyzable silyl group and an olefin site (e.g., alkenyl group) at ends of the molecular chain is added dropwise. The reaction mixture is then aged at a temperature of 40 to 120° C., preferably 60 to 100° C., most preferably about 80° C., for 10 minutes to 12 hours, preferably 1 to 6 hours, most preferably about 3 hours. The reaction mixture may be diluted with an organic solvent prior to the reaction.

Examples of the silane compound having "A" in formula (1) and phenyldimethylsilyl site at ends of the molecular chain include silane compounds having the general formulae (4), (a'), (b'), and (c').

[Chem. 18]

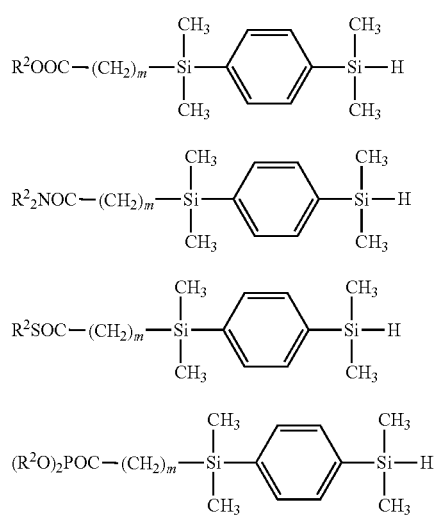

Herein $R^2$ and m are as defined above.

Examples of the silane compound having formula (4) are shown below.

[Chem. 19]

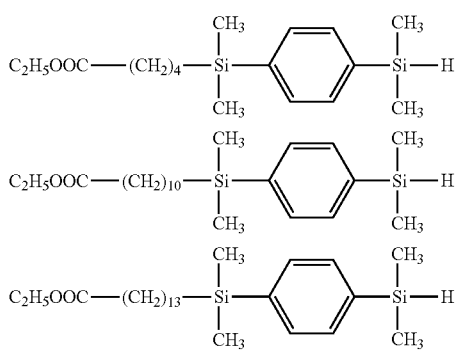

[Chem. 20]

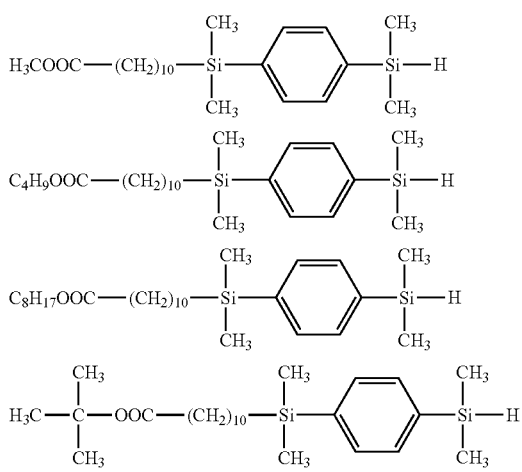

[Chem. 21]

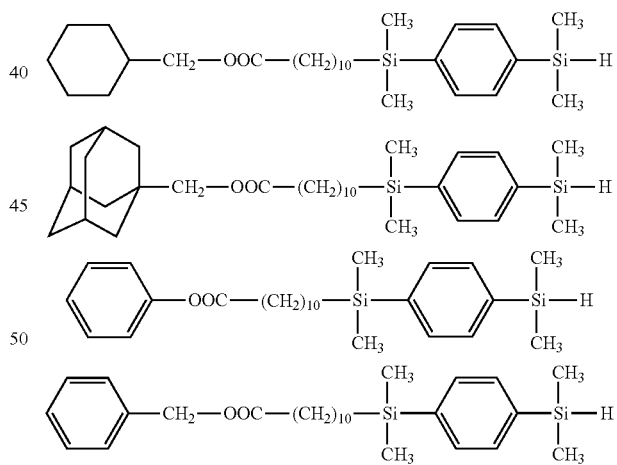

Examples of the silane compound having formula (a') are shown below.

[Chem. 22]

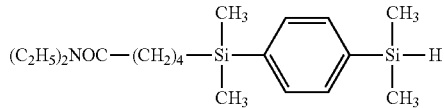

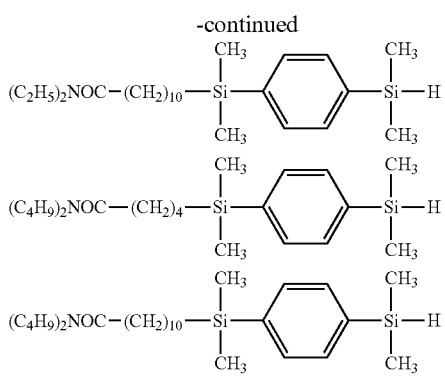

Examples of the silane compound having formula (b') are shown below.

[Chem. 23]

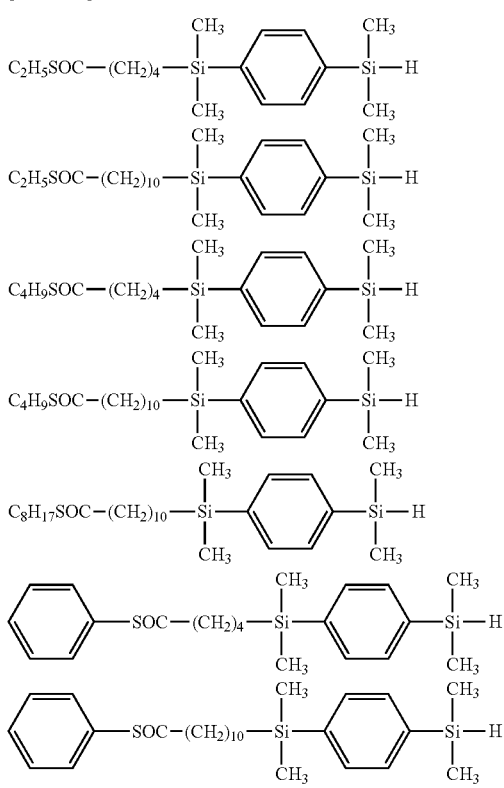

Examples of the silane compound having formula (c') are shown below.

[Chem. 24]

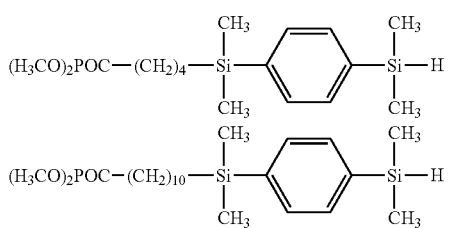

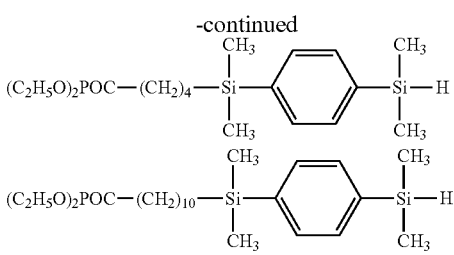

The silane compound having formula (4), (a'), (b') or (c') is prepared, for example, by heating and stirring 1,4-bis(dimethylsilyl)benzene at 40 to 120° C., preferably 60 to 100° C., most preferably about 80° C., and adding a hydrosilylation catalyst, for example, toluene solution of chloroplatinic acid/vinylsiloxane complex. Subsequently, a compound having "A" in formula (1) and an olefin site (e.g., alkenyl group) at ends of the molecular chain is slowly added dropwise over time. The reaction mixture is then aged at a temperature of 40 to 120° C., preferably 60 to 100° C., most preferably about 80° C., for 10 minutes to 12 hours, preferably 1 to 6 hours. The reaction mixture may be diluted with an organic solvent prior to the reaction.

Examples of the compound having "A" in formula (1) and an olefin site at ends of the molecular chain are shown below.

[Chem. 25]

$C_2H_5OOC-(CH_2)_2-CH=CH_2$ $C_2H_5OOC-(CH_2)_8-CH=CH_2$ $C_2H_5OOC-(CH_2)_{11}-CH=CH_2$ $H_3COOC-(CH_2)_8-CH=CH_2$ $C_4H_9OOC-(CH_2)_8-CH=CH_2$ $C_8H_{17}OOC-(CH_2)_8-CH=CH_2$

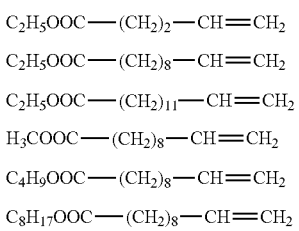

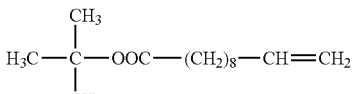

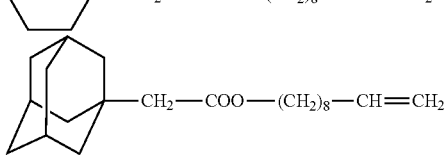

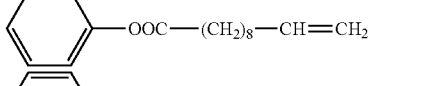

[Chem. 26]

$(C_2H_5)_2NOC-(CH_2)_2-CH=CH_2$ $(C_2H_5)_2NOC-(CH_2)_8-CH=CH_2$ $(C_4H_9)_2NOC-(CH_2)_2-CH=CH_2$ $(C_4H_9)_2NOC-(CH_2)_8-CH=CH_2$ $C_2H_5SOC-(CH_2)_2-CH=CH_2$

-continued

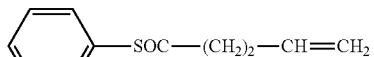
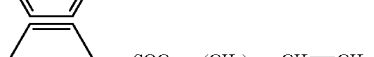

$C_4H_9SOC-(CH_2)_2-CH=CH_2$ $C_4H_9SOC-(CH_2)_8-CH=CH_2$ $C_8H_{17}SOC-(CH_2)_8-CH=CH_2$

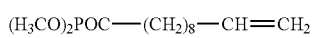

$(H_3CO)_2POC-(CH_2)_2-CH=CH_2$ $(H_3CO)_2POC-(CH_2)_8-CH=CH_2$ $(C_2H_5O)_2POC-(CH_2)_2-CH=CH_2$ $(C_2H_5O)_2POC-(CH_2)_8-CH=CH_2$

The compound having "A" in formula (1) and an olefin site at ends of the molecular chain is preferably used in an amount of 0.05 to 0.5 equivalent, more preferably 0.1 to 0.4 equivalent, most preferably 0.2 equivalent per equivalent of 1,4-bis(dimethylsilyl)benzene.

Examples of the hydrosilylation catalyst used in the preparation of the silane compound having formula (4), (a'), (b') or (c') include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium. Inter alia, platinum based compounds such as vinylsiloxane coordination compounds are preferred.

The hydrosilylation catalyst is preferably used in such an amount as to give 0.1 to 100 ppm, more preferably 0.5 to 50 ppm of transition metal based on the total weight of 1,4-bis(dimethylsilyl)benzene and the compound having "A" in formula (1) and an olefin site at ends of the molecular chain.

In the preparation of the silane compound having formula (4), (a'), (b') or (c'), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The solvent may be used in an amount of 10 to 300 parts by weight, preferably 50 to 150 parts by weight, more preferably about 100 parts by weight per 100 parts by weight of the compound having "A" in formula (1) and an olefin site at ends of the molecular chain.

Through the subsequent steps of quenching the reaction and distilling off the solvent, the silane compound having formula (4), (a'), (b') or (c') is obtained.

Shown below are examples of the compound having a hydrolyzable silyl group and an olefin site (e.g., alkenyl group) at ends of the molecular chain, which is used in the preparation of the lipophilic group-containing (hydrolyzable) organosilane compound having formula (1).

$CH_2=CHSi(OCH_3)_3$ $CH_2=CH-CH_2-Si(OCH_3)_3$ $CH_2=CH-(CH_2)_4-Si(OCH_3)_3$ $CH_2=CH-(CH_2)_6-Si(OCH_3)_3$ [Chem. 27]

The compound having a hydrolyzable silyl group and an olefin site at ends of the molecular chain is preferably used in an amount of 1 to 5 equivalents, more preferably 1.5 to 2.5 equivalents, even more preferably 2 equivalents per equivalent of the silane compound having "A" in formula (1) and phenyldimethylsilyl site at ends of the molecular chain.

Examples of the hydrosilylation catalyst used in the preparation of the lipophilic group-containing (hydrolyzable) organosilane compound having formula (1) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium. Inter alia, platinum based compounds such as vinylsiloxane coordination compounds are preferred.

The hydrosilylation catalyst is preferably used in such an amount as to give 0.1 to 100 ppm, more preferably 0.5 to 50 ppm of transition metal based on the total weight of the silane compound having a site containing "A" and phenyldimethylsilyl site at ends of the molecular chain and the compound having a hydrolyzable silyl group and an olefin site at ends of the molecular chain.

In the preparation of the lipophilic group-containing (hydrolyzable) organosilane compound having formula (1), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The solvent may be used in an amount of 10 to 300 parts by weight, preferably 50 to 150 parts by weight, more preferably about 100 parts by weight per 100 parts by weight of the compound having an ester site and a phenyldimethylsilyl site at ends of the molecular chain.

Through the subsequent steps of quenching the reaction and distilling off the solvent and unreacted reactants, the lipophilic group-containing (hydrolyzable) organosilane compound having formula (1) is obtained.

In one example wherein a compound having the following formula:

[Chem. 28]

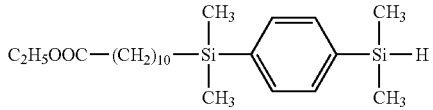

is used as the silane compound having "A" in formula (1) and phenyldimethylsilyl site at ends of the molecular chain and a compound having the following formula:

$CH_2=CH-CH_2-Si(OCH_3)_3$ [Chem. 29]

is used as the compound having a hydrolyzable silyl group and an olefin site at ends of the molecular chain, a compound having the following formula:

[Chem. 30]

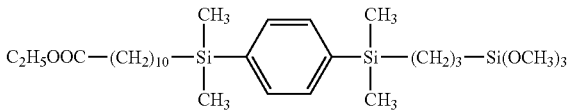

is obtained.

The lipophilic group-containing (hydrolyzable) organosilane compound having formula (1) should preferably have a refractive index of at least 1.45, more preferably 1.46 to 1.52 as measured according to JIS K 0062. Since sebum has a refractive index of about 1.5, sebum marks look inconspicuous as the refractive index of the lipophilic group-containing (hydrolyzable) organosilane compound is closer to that of sebum.

Another embodiment of the invention is a surface treating agent comprising the lipophilic group-containing (hydrolyzable) organosilane compound. The lipophilic group-containing (hydrolyzable) organosilane compound may be used alone or in admixture of two or more, while the surface treating agent may further contain a partial condensate obtained from partial condensation of hydroxyl groups on the lipophilic group-containing organosilane compound, or a partial hydrolytic condensate which is obtained from condensation of hydroxyl groups resulting from previous partial hydrolysis of hydrolyzable end groups on the lipophilic group-containing hydrolyzable organosilane compound by a well-known method.

The surface treating agent may further comprise a solvent. Suitable solvents include alcohol solvents such as propylene glycol monomethyl ether, butanol and isopropanol, ether solvents such as dibutyl ether, diethyl ether and tetrahydrofuran, hydrocarbon solvents such as petroleum benzine, toluene and xylene, ketone solvents such as acetone, methyl ethyl ketone, and methyl isobutyl ketone. Inter alia, alcohol solvents and ether solvents are desirable in view of solubility and wettability, with propylene glycol monomethyl ether and dibutyl ether being most desirable.

The solvents may be used in admixture of two or more while it is preferred that the lipophilic group-containing (hydrolyzable) organosilane compound and its partial (hydrolytic) condensate be uniformly dissolved in the solvent. An optimum concentration of the lipophilic group-containing (hydrolyzable) organosilane compound and its partial (hydrolytic) condensate in the solvent varies with a particular treating mode. The amount which is easy to weigh may be chosen. In the case of direct coating, the concentration may preferably be 0.01 to 10 parts by weight, more preferably 0.05 to 5 parts by weight per 100 parts by weight of the solvent and the lipophilic group-containing (hydrolyzable) organosilane compound (and its partial (hydrolytic) condensate) combined. In the case of evaporation treatment, the concentration may preferably be 1 to 100 parts by weight, more preferably 3 to 30 parts by weight per 100 parts by weight of the solvent and the lipophilic group-containing (hydrolyzable) organosilane compound (and its partial (hydrolytic) condensate) combined. In the case of wet treatment, the concentration may preferably be 0.01 to 10 parts by weight, more preferably 0.05 to 1 part by weight per 100 parts by weight of the solvent and the lipophilic group-containing (hydrolyzable) organosilane compound (and its partial (hydrolytic) condensate) combined.

To the surface treating agent, a hydrolytic condensation catalyst may be added. Suitable hydrolytic condensation catalysts include organotin compounds such as dibutyltin dimethoxide and dibutyltin dilaurate, organotitanium compounds such as tetra-n-butyl titanate, organic acids such as acetic acid and methanesulfonic acid, and inorganic acids such as hydrochloric acid, sulfuric acid and phosphoric acid. Of these, acetic acid, tetra-n-butyl titanate, and dibutyltin dilaurate are desirable.

The hydrolytic condensation catalyst is preferably added in an amount of 0.1 to 150 parts, more preferably 25 to 125 parts, even more preferably 50 to 110 parts by weight per 100 parts by weight of the lipophilic group-containing (hydrolyzable) organosilane compound and/or its partial (hydrolytic) condensate.

The surface treating agent may be applied to a substrate by any well-known techniques such as brush coating, dipping, spraying and evaporation. In the case of evaporation, the heating mode may be either resistance heating or EB heating and is not particularly limited. The curing temperature varies with a particular curing technique. For example, in the case of direct coating (brush coating, dipping or spraying), suitable curing conditions include a temperature of 25 to 200° C., especially 25 to 150° C. for 15 minutes to 36 hours, especially 30 minutes to 24 hours. Curing under humid conditions is also useful. When the coating technique is evaporation, the desirable temperature is in a range of 20 to 200° C. Curing under humid conditions is also useful. The cured coating typically has a thickness of 0.1 to 100 nm, desirably 1 to 20 nm although the thickness is selected depending on the type of substrate. Also, in the case of spray coating, for example, a procedure involving diluting the agent with an organic solvent having water previously added thereto, for thereby effecting hydrolysis to generate Si—OH, and thereafter, spraying the dilution is recommended because the coating rapidly cures.

The surface treating agent cures into a film having a contact angle with oleic acid of preferably up to 30°, more preferably up to 25° as measured at 25° C. and relative humidity 40% by a contact angle meter Drop Master (Kyowa Interface Science Co., Ltd.). When fingerprints (or sebum) are put to the cured film, the fingerprints look inconspicuous because of low visibility due to a small contact angle.

The surface treating agent cures into a film having a haze of preferably up to 10, more preferably up to 7 as measured by a haze meter NDH 5000 (Nippon Denshoku Industries Co., Ltd.) when sebum is deposited to the cured film under a load of 1 kg. When fingerprints (or sebum) are put to the cured film, the fingerprints look inconspicuous because of low visibility due to a low haze.

The surface treating agent cures into a film having a refractive index of 1.45 to 1.52 according to JIS K 0062. When fingerprints (or sebum) are put to the cured film, the fingerprints look inconspicuous because the refractive index of the cured film is close to the refractive index ~1.5 of sebum.

The substrate to be treated with the surface treating agent is not particularly limited, and may be made of any desired materials including paper, fabric, metals, metal oxides, glass, plastics, ceramics, and quartz. The surface treating agent is effective for endowing the substrate with lipophilicity. In particular, the surface treating agent is advantageously used for the treatment of $SiO_2$-deposited glass and film.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, anti-reflective film, and other optical articles. The surface treating agent ensures that fingerprints and sebum, when put to the article, are difficultly visible. Therefore, it is particularly useful as a lipophilic layer on touch panel displays and antireflective films.

EXAMPLES

Examples and Comparative Examples are given below for illustrating the invention, but the invention is not limited by Examples.

Example 1

A reactor was charged with 45.7 g ($2.35 \times 10^{-1}$ mol) of 1,4-bis(dimethylsilyl)benzene, which was heated at 80° C. Then $1.0 \times 10^{-2}$ g of a toluene solution of chloroplatinic acid/vinylsiloxane complex (containing $0.3 \times 10^{-6}$ mol of Pt) was added, after which 10.0 g ($4.71 \times 10^{-2}$ mol) of ethyl undecenoate was added dropwise over 3 hours. This was followed by heating and stirring for 1 hour. The solvent and unreacted reactants were distilled off under reduced pressure, obtaining 18.0 g of a product having the formula (A).

[Chem. 31]

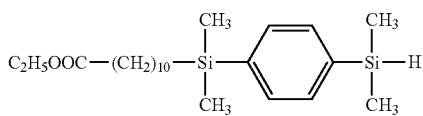

(A)

$^1$H-NMR
δ 0.2-0.4 (—Si—C$\underline{H_3}$) 12H
δ 0.7 (—(CH$_2$)$_7$C$\underline{H_2}$—Si—) 2H
δ 1.2-1.5 (—(C$\underline{H_2}$)$_7$—, —OCH$_2$C$\underline{H_3}$) 17H
δ 1.6 (—OOC—CH$_2$C$\underline{H_2}$(CH$_2$)$_7$CH$_2$—Si—) 2H
δ 2.3 (—OOC—C$\underline{H_2}$—) 2H
δ 4.1 (—OC$\underline{H_2}$CH$_3$) 2H
δ 4.4 (—Si—H) 1H
δ 7.5 (—Si—C$_6$$\underline{H_4}$—Si—) 4H A reactor was charged with 10.0 g ($2.46 \times 10^{-2}$ mol) of the compound having formula (A).

[Chem. 32]

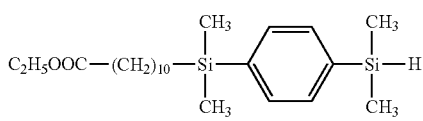

(A)

It was heated at 80° C. Then $1.0 \times 10^{-2}$ g of toluene solution of chloroplatinic acid/vinylsiloxane complex (containing $0.3 \times 10^{-6}$ mol of Pt) was added, after which 8.00 g ($4.92 \times 10^{-3}$ mol) of allyltrimethoxysilane was added dropwise. This was followed by heating and stirring for 3 hours. The solvent and unreacted reactants were distilled off under reduced pressure, obtaining 13.1 g of a product (lipophilic group-containing hydrolyzable organosilane compound 1) having the formula (B).

[Chem. 33]

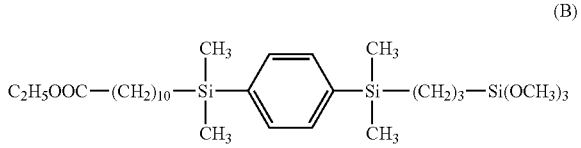

(B)

$^1$H-NMR
δ 0.2-0.3 (—Si—C$\underline{H_3}$) 12H
δ 0.7 (—(CH$_2$)$_7$C$\underline{H_2}$—Si—, —SiC$\underline{H_2}$CH$_2$CH$_2$—Si(OCH$_3$)$_3$) 4H
δ 0.8 (—SiCH$_2$CH$_2$C$\underline{H_2}$—Si(OCH$_3$)$_3$) 2H
δ 1.2-1.4 (—(C$\underline{H_2}$)$_7$—, —OCH$_2$C$\underline{H_3}$) 17H
δ 1.5 (—SiCH$_2$C$\underline{H_2}$CH$_2$—Si(OCH$_3$)$_3$) 2H
δ 1.6 (—OOC—CH$_2$C$\underline{H_2}$(CH$_2$)$_7$CH$_2$—Si—) 2H
δ 2.3 (—OOC—C$\underline{H_2}$—) 2H
δ 3.5 (—SiCH$_2$CH$_2$CH$_2$—Si(OC$\underline{H_3}$)$_3$) 9H
δ 4.1 (—OC$\underline{H_2}$CH$_3$) 2H
δ 7.5 (—Si—C$_6$$\underline{H_4}$—Si—) 4H

Example 2

A reactor was charged with 75.7 g ($3.90 \times 10^{-1}$ mol) of 1,4-bis(dimethylsilyl)benzene, which was heated at 80° C. Then $1.0 \times 10^{-2}$ g of toluene solution of chloroplatinic acid/vinylsiloxane complex (containing $0.3 \times 10^{-2}$ mol of Pt) was added, after which 10.0 g ($7.80 \times 10^{-2}$ mol) of ethyl pentenoate was added dropwise over 3 hours. This was followed by heating and stirring for 1 hour. The solvent and unreacted reactants were distilled off under reduced pressure, obtaining 23.4 g of a product having the formula (C).

[Chem. 34]

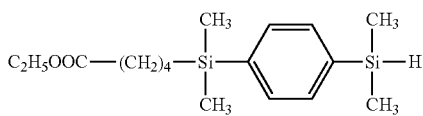

(C)

$^1$H-NMR
δ 0.2-0.4 (—Si—C$\underline{H_3}$) 12H
δ 0.7 (—CH$_2$CH$_2$CH$_2$C$\underline{H_2}$—Si—) 2H
δ 1.2 (—OCH$_2$C$\underline{H_3}$) 3H
δ 1.3 (—(CH$_2$CH$_2$C$\underline{H_2}$CH$_2$—Si—) 2H
δ 1.6 (—CH$_2$C$\underline{H_2}$CH$_2$CH$_2$—Si—) 2H
δ 2.3 (—OOC—C$\underline{H_2}$—) 2H
δ 4.1 (—OC$\underline{H_2}$CH$_3$) 2H
δ 4.4 (—Si—H) 1H
δ 7.5 (—Si—C$_6$$\underline{H_4}$—Si—) 4H A reactor was charged with 10.0 g ($3.10 \times 10^{-2}$ mol) of the compound having formula (C).

[Chem. 35]

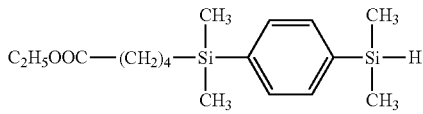

(C)

It was heated at 80° C. Then $1.0 \times 10^{-2}$ g of toluene solution of chloroplatinic acid/vinylsiloxane complex (containing $0.3 \times 10^{-6}$ mol of Pt) was added, after which 10.1 g ($6.20 \times 10^{-2}$ mol) of allyltrimethoxysilane was added dropwise. This was followed by heating and stirring for 3 hours. The solvent and unreacted reactants were distilled off under reduced pressure, obtaining 14.5 g of a product (lipophilic group-containing hydrolyzable organosilane compound 2) having the formula (D).

[Chem. 36]

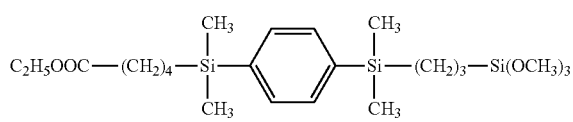
(D)

¹H-NMR
δ 0.2-0.3 (—Si—C$\underline{H}_3$) 12H
δ 0.7 (—CH$_2$CH$_2$CH$_2$C$\underline{H}_2$—Si—, —SiCH$_2$CH$_2$—Si(OCH$_3$)$_3$) 4H
δ 0.8 (—SiCH$_2$CH$_2$C$\underline{H}_2$—Si(OCH$_3$)$_3$) 2H
δ 1.2 (—OCH$_2$C$\underline{H}_3$) 3H
δ 1.3 (—CH$_2$CH$_2$C$\underline{H}_2$CH$_2$—Si—) 2H
δ 1.5 (—SiCH$_2$C$\underline{H}_2$—Si(OCH$_3$)$_3$) 2H
δ 1.6 (—CH$_2$C$\underline{H}_2$CH$_2$CH$_2$—Si—) 2H
δ 2.3 (—OOC—C$\underline{H}_2$—) 2H
δ 3.5 (—SiCH$_2$CH$_2$—Si(OC$\underline{H}_3$)$_3$) 9H
δ 4.1 (—OC$\underline{H}_2$CH$_3$) 2H
δ 7.5 (—Si—C$_6\underline{H}_4$—Si—) 4H Example 3

A reactor was charged with 32.8 g (1.69×10⁻¹ mol) of 1,4-bis(dimethylsilyl)benzene, which was heated at 80° C. Then 1.0×10⁻² g of toluene solution of chloroplatinic acid/vinylsiloxane complex (containing 0.3×10⁻⁶ mol of Pt) was added, after which 10.0 g (3.38×10⁻² mol) of octyl undecenoate was added dropwise over 3 hours. This was followed by heating and stirring for 1 hour. The solvent and unreacted reactants were distilled off under reduced pressure, obtaining 15.2 g of a product having the formula (E).

[Chem. 37]

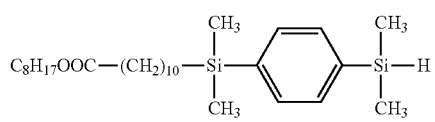
(E)

¹H-NMR
δ 0.2-0.4 (—Si—C$\underline{H}_3$) 12H
δ 0.7 (—(CH$_2$)$_7$C$\underline{H}_2$—Si—) 2H
δ 0.9 (—OCH$_2$(CH$_2$)$_6$C$\underline{H}_3$) 3H
δ 1.2-1.5 (—(C$\underline{H}_2$)$_7$—, —OCH$_2$(C$\underline{H}_2$)$_6$CH$_3$) 26H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 4.1 (—OC$\underline{H}_2$(CH$_2$)$_6$CH$_3$) 2H
δ 4.4 (—Si—H) 1H
δ 7.5 (—Si—C$_6\underline{H}_4$—Si—) 4H A reactor was charged with 10.0 g (2.04×10⁻² mol) of the compound having formula (E).

[Chem. 38]

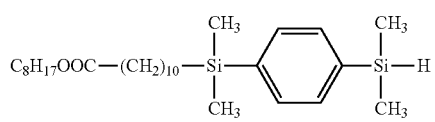
(E)

It was heated at 80° C. Then 1.0×10⁻² g of toluene solution of chloroplatinic acid/vinylsiloxane complex (containing 0.3×10⁻⁶ mol of Pt) was added, after which 6.61 g (4.08×10⁻² mol) of allyltrimethoxysilane was added dropwise. This was followed by heating and stirring for 3 hours. The solvent and unreacted reactants were distilled off under reduced pressure, obtaining 12.0 g of a product (lipophilic group-containing hydrolyzable organosilane compound 3) having the formula (F).

[Chem. 39]

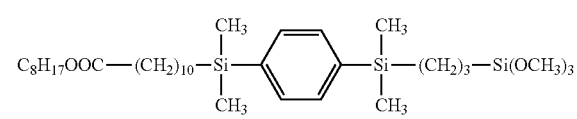
(F)

¹H-NMR
δ 0.2-0.3 (—Si—C$\underline{H}_3$) 12H
δ 0.7 (—(CH$_2$)$_7$C$\underline{H}_2$—Si—, —SiCH$_2$CH$_2$—Si(OCH$_3$)$_3$) 4H
δ 0.8-0.9 (—SiCH$_2$CH$_2$C$\underline{H}_2$—Si(OCH$_3$)$_3$, —OCH$_2$(CH$_2$)$_6$CH$_3$) 5H
δ 1.2-1.4 (—(C$\underline{H}_2$)$_7$—, —OCH$_2$(C$\underline{H}_2$)$_6$CH$_3$) 26H
δ 1.5 (—SiCH$_2$C$\underline{H}_2$CH$_2$—Si(OCH$_3$)$_3$) 2H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 9H
δ 4.1 (—OC$\underline{H}_2$(CH$_2$)$_6$CH$_3$) 2H
δ 7.5 (—Si—C$_6\underline{H}_4$—Si—) 4H Example 4

A reactor was charged with 10.0 g (2.46×10⁻² mol) of the compound having formula (A).

[Chem. 40]

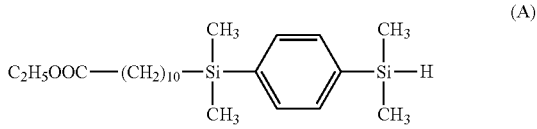
(A)

It was heated at 80° C. Then 1.0×10⁻² g of toluene solution of chloroplatinic acid/vinylsiloxane complex (containing 0.3×10⁻⁶ mol of Pt) was added, after which 9.10 g (3.94×10⁻² mol) of 7-octenyltrimethoxysilane was added dropwise. This was followed by heating and stirring for 4 hours. The solvent and unreacted reactants were distilled off under reduced pressure, obtaining 14.0 g of a product (lipophilic group-containing hydrolyzable organosilane compound 4) having the formula (G).

[Chem. 41]

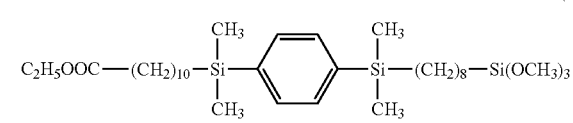
(G)

¹H-NMR
δ 0.2 (—Si—C$\underline{H}_3$) 12H
δ 0.6 (—SiC$\underline{H}_2$(CH$_2$)$_6$CH$_2$—Si(OCH$_3$)$_3$) 4H
δ 0.7 (—(CH$_2$)$_7$C$\underline{H}_2$—Si—, —SiCH$_2$(CH$_2$)$_6$C$\underline{H}_2$—Si(OCH$_3$)$_3$) 2H
δ 1.2-1.4 (—(C$\underline{H}_2$)$_7$—, —(C$\underline{H}_2$)$_6$—, —OCH$_2$C$\underline{H}_3$) 31H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$(CH$_2$)$_6$CH$_2$—Si(OC$\underline{H}_3$)$_3$) 9H
δ 4.1 (—OC$\underline{H}_2$CH$_3$) 2H
δ 7.5 (—Si—C$_6\underline{H}_4$—Si—) 4H Example 5

A reactor was charged with 40.6 g (2.09×10$^{-1}$ mol) of 1,4-bis(dimethylsilyl)benzene, which was heated at 80° C. Then 1.0×10$^{-2}$ g of toluene solution of chloroplatinic acid/vinylsiloxane complex (containing 0.3×10$^{-6}$ mol of Pt) was added, after which 10.0 g (4.18×10$^{-2}$ mol) of a compound having the formula (H):

[Chem. 42]

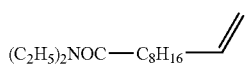

(H)

was added dropwise over 3 hours. This was followed by heating and stirring for 6 hours. The solvent and unreacted reactants were distilled off under reduced pressure, obtaining 17.1 g of a product having the formula (I).

[Chem. 43]

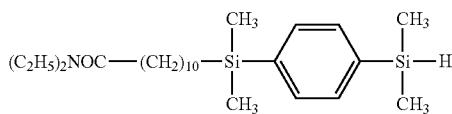

(I)

¹H-NMR
δ 0.2-0.4 (—Si—C$\underline{H}_3$) 12H
δ 0.7 (—(CH$_2$)$_7$C$\underline{H}_2$—Si—) 2H
δ 1.0-1.2 (—N(CH$_2$C$\underline{H}_3$)$_2$) 6H
δ 1.2-1.5 (—(C$\underline{H}_2$)$_7$—) 14H
δ 1.6 (—NOC—CH$_2$C$\underline{H}_2$(CH$_2$)$_7$CH$_2$—Si—) 2H
δ 2.3 (—NOC—C$\underline{H}_2$—) 2H
δ 3.2-3.4 (—N(C$\underline{H}_2$CH$_3$)$_2$) 4H
δ 4.4 (—Si—H) 1H
δ 7.5 (—Si—C$_6\underline{H}_4$—Si—) 4H A reactor was charged with 10.0 g (2.31×10$^{-2}$ mol) of the compound having formula (I).

[Chem. 44]

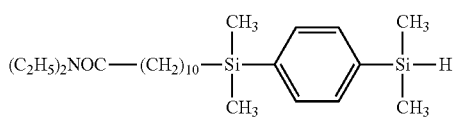

(I)

It was heated at 80° C. Then 1.0×10$^{-2}$ g of toluene solution of chloroplatinic acid/vinylsiloxane complex (containing 0.3×10$^{-6}$ mol of Pt) was added, after which 7.50 g (4.62× 10$^{-2}$ mol) of allyltrimethoxysilane was added dropwise. This was followed by heating and stirring for 6 hours. The solvent and unreacted reactants were distilled off under reduced pressure, obtaining 12.6 g of a product (lipophilic group-containing hydrolyzable organosilane compound 5) having the formula (J).

[Chem. 45]

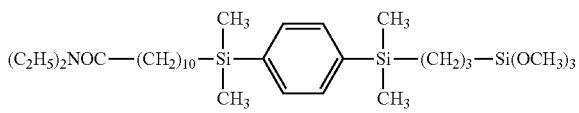

(J)

¹H-NMR
δ 0.2-0.3 (—Si—C$\underline{H}_3$) 12H
δ 0.7 (—(CH$_2$)$_7$C$\underline{H}_2$—Si—, —SiC$\underline{H}_2$CH$_2$CH$_2$—Si(OCH$_3$)$_3$) 4H
δ 0.8 (—SiCH$_2$CH$_2$C$\underline{H}_2$—Si(OCH$_3$)$_3$) 2H
δ 1.0-1.2 (—N(CH$_2$C$\underline{H}_3$)$_2$) 6H
δ 1.2-1.4 (—(C$\underline{H}_2$)$_7$—) 14H
δ 1.5 (—SiCH$_2$C$\underline{H}_2$CH$_2$—Si(OCH$_3$)$_3$) 2H
δ 1.6 (—NOC—CH$_2$C$\underline{H}_2$(CH$_2$)$_7$CH$_2$—Si—) 2H
δ 2.3 (—NOC—C$\underline{H}_2$—) 2H
δ 3.2-3.4 (—N(C$\underline{H}_2$CH$_3$)$_2$) 4H
δ 3.5 (—SiCH$_2$CH$_2$CH$_2$—Si(OC$\underline{H}_3$)$_3$) 9H
δ 7.5 (—Si—C$_6\underline{H}_4$—Si—) 4H Example 6

A reactor was charged with 31.1 g (1.60×10$^{-1}$ mol) of 1,4-bis(dimethylsilyl)benzene, which was heated at 80° C. Then 1.0×10$^{-2}$ g of toluene solution of chloroplatinic acid/vinylsiloxane complex (containing 0.3×10$^{-6}$ mol of Pt) was added, after which 10.0 g (3.20×10$^{-2}$ mol) of a compound having the formula (K):

[Chem. 46]

(K)

was added dropwise over 3 hours. This was followed by heating and stirring for 6 hours. The solvent and unreacted reactants were distilled off under reduced pressure, obtaining 15.2 g of a product having the formula (L).

[Chem. 47]

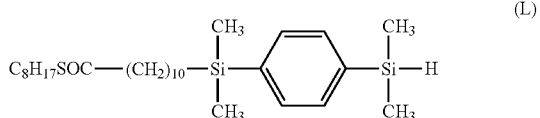

(L)

¹H-NMR
δ 0.2-0.4 (—Si—C$\underline{H}_3$) 12H
δ 0.7 (—(CH$_2$)$_7$C$\underline{H}_2$—Si—) 2H
δ 0.9 (—SCH$_2$(CH$_2$)$_6$C$\underline{H}_3$) 3H
δ 1.2-1.5 (—(C$\underline{H}_2$)$_7$—, —SCH$_2$(C$\underline{H}_2$)$_6$CH$_3$) 26H
δ 1.6 (—SOC—CH$_2$C$\underline{H}_2$(CH$_2$)$_7$CH$_2$—Si—) 2H δ 2.3 (—SOC—C$\underline{H}_2$—) 2H δ 2.8 (—SC$\underline{H}_2$(CH$_2$)$_6$CH$_3$) 2H δ 4.4 (—Si—H) 1H δ 7.5 (—Si—C$_6\underline{H}_4$—Si—) 4H A reactor was charged with 10.0 g (1.97×10$^{-2}$ mol) of the compound having formula (L).

[Chem. 48]

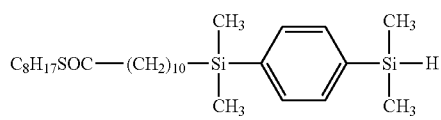

(L)

It was heated at 80° C. Then 1.0×10$^{-2}$ g of toluene solution of chloroplatinic acid/vinylsiloxane complex (containing 0.3×10$^{-6}$ mol of Pt) was added, after which 6.41 g (3.95×10$^{-2}$ mol) of allyltrimethoxysilane was added dropwise. This was followed by heating and stirring for 6 hours. The solvent and unreacted reactants were distilled off under reduced pressure, obtaining 11.9 g of a product (lipophilic group-containing hydrolyzable organosilane compound 6) having the formula (M).

[Chem. 49]

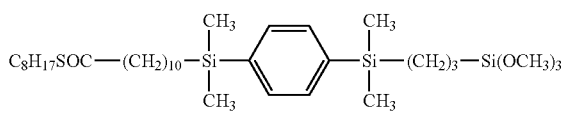

(M)

$^1$H-NMR

δ 0.2-0.3 (—Si—C$\underline{H}_3$) 12H

δ 0.7 (—(CH$_2$)$_7$C$\underline{H}_2$—Si—, —SiCH$_2$CH$_2$—Si(OCH$_3$)$_3$) 4H

δ 0.8-0.9 (—SiCH$_2$CH$_2$C$\underline{H}_2$—Si(OCH$_3$)$_3$, —SCH$_2$(CH$_2$)$_6$C$\underline{H}_3$) 5H δ 1.2-1.4 (—(C$\underline{H}_2$)$_7$—, —SCH$_2$(C$\underline{H}_2$)$_6$CH$_3$) 26H δ 1.5 (—SiCH$_2$C$\underline{H}_2$CH$_2$—Si(OCH$_3$)$_3$) 2H δ 1.6 (—SOC—CH$_2$C$\underline{H}_2$(CH$_2$)$_7$CH$_2$—Si—) 2H δ 2.3 (—SOC—C$\underline{H}_2$—) 2H δ 2.8 (—SC$\underline{H}_2$(CH$_2$)$_6$CH$_3$) 2H δ 3.5 (—SiCH$_2$CH$_2$CH$_2$—Si(OC$\underline{H}_3$)$_3$) 9H δ 7.5 (—Si—C$_6\underline{H}_4$—Si—) 4H The following compounds were used for comparison.

Comparative Example 1

Lipophilic group-containing hydrolyzable organosilane compound 7 having the formula (N)

[Chem. 50]

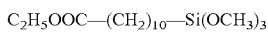

(N)

Comparative Example 2

Hydrolyzable organosilane compound 8 having the formula (O)

[Chem. 51]

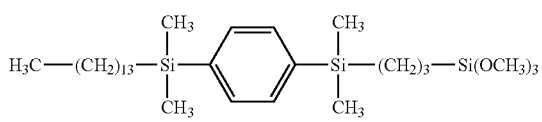

(O)

Comparative Example 3

Hydrolyzable organosilane compound 9 having the formula (P)

[Chem. 52]

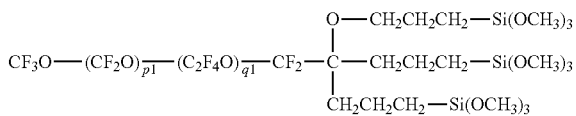

(P)

p1:q1 = 47:53, p1 + q1 ≈ 43

Preparation of Surface Treating Agent and Formation of Cured Film

A surface treating agent was prepared by dissolving each of lipophilic group-containing hydrolyzable organosilane compounds 1 to 6 having formulae (B), (D), (F), (G), (J) and (M) in Examples 1 to 6 and hydrolyzable organosilane compounds 7 and 8 having formulae (N) and (O) in Comparative Examples 1 and 2 in propylene glycol monomethyl ether in a concentration of 0.1 wt % and further dissolving acetic acid in a concentration of 0.1 wt %. Then the treating agent was dip coated onto Gorilla glass (Corning Inc.) and heat cured at 120° C. for 30 minutes to form a cured film of 3 nm thick.

A surface treating agent was prepared by dissolving hydrolyzable organosilane compound 9 having formula (P) in Comparative Example 3 in solvent Novec 7200 (ethyl perfluorobutyl ether by 3M) in a concentration of 0.1 wt %. Then the treating agent was dip coated onto Gorilla glass (Corning Inc.) and heat cured at 120° C. for 30 minutes to form a cured film of 8 nm thick.

Comparative Example 4 used uncoated Gorilla glass (Corning Inc.) as a blank.

Evaluation of Lipophilicity

[Evaluation of Initial Lipophilicity]

Using a contact angle meter Drop Master (Kyowa Interface Science Co., Ltd.), the glass sample with the cured film or uncoated glass sample, prepared above, was measured for a contact angle with oleic acid as an index of lipophilicity (droplet 2 μL, temperature 25° C., humidity 40% RH). The results (initial contact angle with oleic acid) are shown in Table 1.

Examples showed satisfactory lipophilicity at the initial.
Evaluation of Fingerprint Low-Visibility
[Evaluation of Fingerprint Visibility]
Sebum was deposited on the glass sample with the cured film or uncoated glass sample, prepared above, under a load of 1 kg. Visibility was evaluated in 4 grades by a sensory test of visual observation. The results are shown in Table 1.
  4: fingerprints little visible
  3: fingerprints fairly visible
  2: fingerprints thinly, but definitely visible
  1: fingerprints definitely visible
[Evaluation of Haze]
Sebum was deposited on the glass sample with the cured film or uncoated glass sample, prepared above, under a load of 1 kg. Haze was measured by a haze meter NDH 5000 (Nippon Denshoku Industries Co., Ltd.).
[Evaluation of Refractive Index]
The refractive index of the organosilane compounds of Examples 1 to 6 and Comparative Examples 1 to 3 was measured according to JIS K 0062.

TABLE 1

|  | Initial contact angle with oleic acid (°) | Fingerprint visibility | Haze | Refractive index |
| --- | --- | --- | --- | --- |
| Example 1 | 22 | 4 | 3.2 | 1.48 |
| Example 2 | 25 | 4 | 6.5 | 1.48 |
| Example 3 | 21 | 4 | 4.1 | 1.48 |
| Example 4 | 24 | 4 | 3.9 | 1.48 |
| Example 5 | 23 | 4 | 3.5 | 1.48 |
| Example 6 | 25 | 4 | 3.8 | 1.49 |
| Comparative Example 1 | 23 | 2 | 12.3 | 1.43 |
| Comparative Example 2 | 26 | 3 | 11.0 | 1.43 |
| Comparative Example 3 | 72 | 1 | 9.3 | 1.31 |
| Comparative Example 4 | 35 | 1 | 19.0 | — |

In Examples 1 to 6, fingerprints were not at all visible. In Comparative Example 1 not containing phenylene group and Comparative Example 2 not containing carbonyl group, fingerprints were visible. In Comparative Example 3 which is a perfluoropolyether compound not containing a lipophilic group, fingerprints were definitely visible.

In the haze measurement by haze meter, all Examples show low haze values, which are compatible with the results of the sensory test.

As to refractive index, those compounds having a refractive index closer to the refractive index (~1.5) of sebum are more effective for rendering fingerprints least visible.

The invention claimed is:

1. An organosilane compound having the general formula (1):

[Chem. 1]

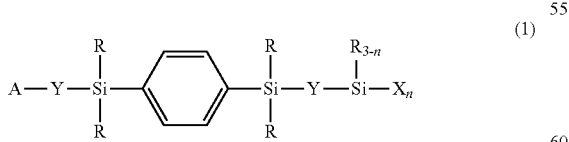

(1)

wherein A is $-C(=O)NR^1_2$, $-C(=O)SR^1$, or $-P(=O)(OR^1)_2$, $R^1$ is hydrogen, a $C_1$-$C_{30}$ alkyl group, $C_6$-$C_{30}$ aryl group or $C_7$-$C_{30}$ aralkyl group, Y is independently a divalent organic group, R is a $C_1$-$C_4$ alkyl group or phenyl group, X is independently a hydroxyl group, a $C_1$-$C_{10}$ alkoxy group, a $C_2$-$C_{10}$ alkoxy-substituted alkoxy group, a $C_2$-$C_{10}$ acyloxy group, a $C_2$-$C_{10}$ alkenyloxy group, a halogen atom, an oxime group, an isocyanate group, or a cyanate group, and n is an integer of 1 to 3.

2. The organosilane compound of claim 1 wherein in formula (1), Y is a $C_2$-$C_{30}$ alkylene group which may contain a divalent group selected from the group consisting of $-O-$, $-S-$, $-NR-$, $-C(=O)-$, $-C(=O)O-$, $-C(=O)NR-$, $-OC(=O)NR-$, silalkylene group, silarylene group, and straight, branched or cyclic divalent organopolysiloxane residues of 2 to 10 silicon atoms, wherein R is $C_1$-$C_4$ alkyl or phenyl, and which may contain a $C_6$-$C_{20}$ arylene group.

3. The organosilane compound of claim 1 wherein in formula (1), X is each independently selected from the group consisting of hydroxyl, methoxy, ethoxy, isopropenoxy and chlorine.

4. The organosilane compound of claim 1, having a refractive index of at least 1.45.

5. A surface treating agent comprising at least one selected from the group consisting of at least one organosilane compound of claim 1, a partial condensate thereof and a partial hydrolytic condensate thereof.

6. The surface treating agent of claim 5, further comprising a solvent.

7. The surface treating agent of claim 5, further comprising a catalyst selected from the group consisting of organotin compounds, organotitanium compounds, organic acids, inorganic acids, and mixtures thereof.

8. The surface treating agent of claim 5, which cures into a film having a contact angle with oleic acid of up to 30° at 25° C. and relative humidity 40%.

9. The surface treating agent of claim 5, which cures into a film having a haze of up to 10 when sebum is deposited to the cured film under a load of 1 kg.

10. An article having on its surface a cured film of the surface treating agent of claim 5.

11. A method for degrading the fingerprint visibility when fingerprints are put on a substrate, comprising a step of forming a cured film of a surface treating agent comprising at least one selected from the group consisting of at least one organosilane compound, a partial condensate thereof and a partial hydrolytic condensate thereof on a surface of a substrate, wherein the organosilane compound having the general formula (1):

[Chem. 3]

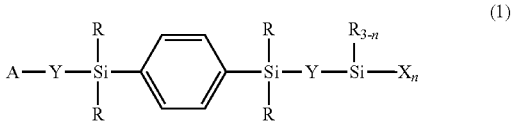

(1)

wherein A is $-C(=O)OR^1$, $-C(=O)NR^1_2$, $-C(=O)SR^1$, or $-P(=O)(OR^1)_2$, $R^1$ is hydrogen, a $C_1$-$C_{30}$ alkyl group, $C_6$-$C_{30}$ aryl group or $C_7$-$C_{30}$ aralkyl group, Y is independently a divalent organic group, R is a $C_1$-$C_4$ alkyl group or phenyl group, X is independently a hydroxyl group, a $C_1$-$C_{10}$ alkoxy group, a $C_2$-$C_{10}$ alkoxy-substituted alkoxy group, a $C_2$-$C_{10}$ acyloxy group, a $C_2$-$C_{10}$ alkenyloxy group, a halogen atom, an oxime group, an isocyanate group, or a cyanate group, and n is an integer of 1 to 3, and wherein the cured film has a refractive index of 1.45 to 1.52 as measured according to JIS K 0062.

12. The method of claim 11 wherein in formula (1), when A is —C(=O)OR$^1$, R$^1$ is ethyl, R is methyl, and n is 3, then X cannot be a methoxy group.

13. The method of claim 11 wherein in formula (1), A is —C(=O)NR$^1_2$, —C(=O)SR$^1$, or —P(=O)(OR$^1$)$_2$.

14. The method of claim 11 wherein in formula (1), Y is a C$_2$-C$_{30}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is C$_1$-C$_4$ alkyl or phenyl, and which may contain a C$_6$-C$_{20}$ arylene group.

15. The method of claim 11 wherein in formula (1), X is each independently selected from the group consisting of hydroxyl, methoxy, ethoxy, isopropenoxy and chlorine.

16. The method of claim 11 wherein the organosilane compound represents by the formula (2):

[Chem. 4]

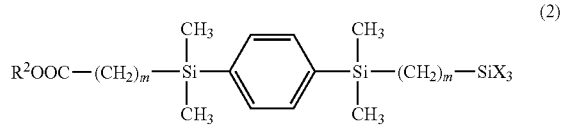

(2)

wherein R$^1$ is a C$_1$-C$_{20}$ alkyl group, C$_6$-C$_{20}$ aryl group or C$_7$-C$_{20}$ aralkyl group, m is each independently an integer of 2 to 20, and X is independently a group as defined in claim 11.

17. The method of claim 11 wherein the organosilane compound has a refractive index of at least 1.45.

18. The method of claim 11 wherein the surface treating agent further comprises a solvent.

19. The method of claim 11 wherein the surface treating agent further comprises catalyst selected from the group consisting of organotin compounds, organotitanium compounds, organic acids, inorganic acids, and mixtures thereof.

20. The method of claim 11 wherein the cured film has a contact angle with oleic acid of up to 30° at 25° C. and relative humidity 40%.

21. The method of claim 11 wherein the cured film has a haze of up to 10 when sebum is deposited to the cured film under a load of 1 kg.

22. An organosilane compound having the general formula (1):

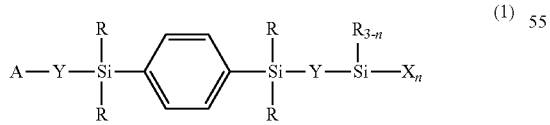

(1)

wherein A is —C(=O)OR$^1$, —C(=O)NR$^1_2$, —C(=O)SR$^1$, or —P(=O)(OR$^1$)$_2$, R$^1$ is hydrogen, a C$_1$-C$_{30}$ alkyl group, C$_6$-C$_{30}$ aryl group or C$_7$-C$_{30}$ aralkyl group, Y is independently a divalent organic group, R is a C$_1$-C$_4$ alkyl group or phenyl group, X is independently a hydroxyl group, a C$_1$-C$_{10}$ alkoxy group, a C$_2$-C$_{10}$ alkoxy-substituted alkoxy group, a C$_2$-C$_{10}$ acyloxy group, a C$_2$-C$_{10}$ alkenyloxy group, a halogen atom, an oxime group, an isocyanate group, or a cyanate group, and n is an integer of 1 to 3, with the proviso that the organosilane compound of general formula (1) cannot be a compound of the following formula:

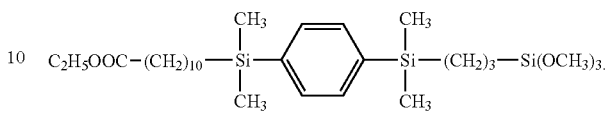

23. An organosilane compound having the general formula (1):

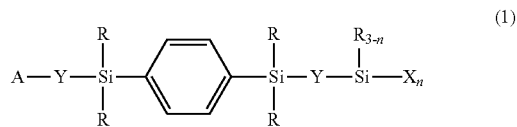

(1)

wherein A is —C(=O)OR$^1$, R$^1$ is hydrogen, a C$_1$-C$_{30}$ alkyl group, C$_6$-C$_{30}$ aryl group or C$_7$-C$_{30}$ aralkyl group, Y is independently a divalent organic group, R is a C$_1$-C$_4$ alkyl group or phenyl group, X is independently a hydroxyl group, a C$_2$-C$_{10}$ alkoxy group, a C$_2$-C$_{10}$ alkoxy-substituted alkoxy group, a C$_2$-C$_{10}$ acyloxy group, a C$_2$-C$_{10}$ alkenyloxy group, a halogen atom, an oxime group, an isocyanate group, or a cyanate group, and n is an integer of 1 to 3.

24. An organosilane compound having the general formula (1):

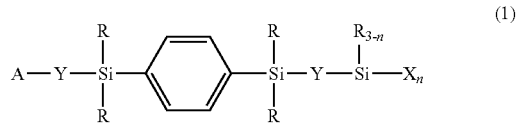

(1)

wherein A is —C(=O)OR$^1$, R$^1$ is hydrogen, a C$_1$-C$_{30}$ alkyl group, C$_6$-C$_{30}$ aryl group or C$_7$-C$_{30}$ aralkyl group, Y is independently a C$_2$-C$_9$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein, R is a C$_1$-C$_4$ alkyl group or phenyl group, X is independently a hydroxyl group, a C$_1$-C$_{10}$ alkoxy group, a C$_2$-C$_{10}$ alkoxy-substituted alkoxy group, a C$_2$-C$_{10}$ acyloxy group, a C$_2$-C$_{10}$ alkenyloxy group, a halogen atom, an oxime group, an isocyanate group, or a cyanate group, and n is an integer of 1 to 3.

25. An organosilane compound having the general formula (1):

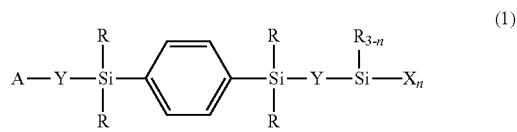

(1)

wherein A is —C(=O)OR$^1$, R$^1$ is hydrogen, methyl, a C$_3$-C$_{30}$ alkyl group, C$_6$-C$_{30}$ aryl group or C$_7$-C$_{30}$ aralkyl group, Y is independently a divalent organic group, R is a C$_1$-C$_4$ alkyl group or phenyl group, X is independently a hydroxyl group, a C$_1$-C$_{10}$ alkoxy group, a C$_2$-C$_{10}$ alkoxy-substituted alkoxy group, a C$_2$-C$_{10}$ acyloxy group, a C$_2$-C$_{10}$ alkenyloxy group, a halogen atom, an oxime group, an isocyanate group, or a cyanate group, and n is an integer of 1 to 3.

26. An organosilane compound having the general formula (1):

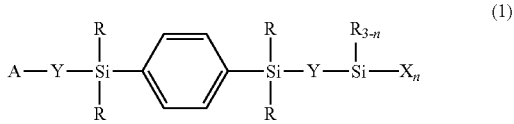

wherein A is —C(=O)OR$^1$, R$^1$ is hydrogen, a C$_1$-C$_{30}$ alkyl group, C$_6$-C$_{30}$ aryl group or C$_7$-C$_{30}$ aralkyl group, Y is independently a divalent organic group, R is a C$_2$-C$_4$ alkyl group or phenyl group, X is independently a hydroxyl group, a C$_1$-C$_{10}$ alkoxy group, a C$_2$-C$_{10}$ alkoxy-substituted alkoxy group, a C$_2$-C$_{10}$ acyloxy group, a C$_2$-C$_{10}$ alkenyloxy group, a halogen atom, an oxime group, an isocyanate group, or a cyanate group, and n is an integer of 1 to 3.

27. An organosilane compound having the general formula (1):

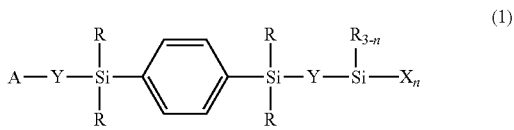

wherein A is —C(=O)OR$^1$, R$^1$ is hydrogen, a C$_1$-C$_{30}$ alkyl group, C$_6$-C$_{30}$ aryl group or C$_7$-C$_{30}$ aralkyl group, Y is independently a divalent organic group, R is a C$_1$-C$_4$ alkyl group or phenyl group, X is independently a hydroxyl group, a C$_1$-C$_{10}$ alkoxy group, a C$_2$-C$_{10}$ alkoxy-substituted alkoxy group, a C$_2$-C$_{10}$ acyloxy group, a C$_2$-C$_{10}$ alkenyloxy group, a halogen atom, an oxime group, an isocyanate group, or a cyanate group, and n is 1 or 2.

28. The organosilane compound of claim 23, wherein in formula (1), Y is a C$_2$-C$_{30}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is C$_1$-C$_4$ alkyl or phenyl.

29. The organosilane compound of claim 25, wherein in formula (1), Y is a C$_2$-C$_{30}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is C$_1$-C$_4$ alkyl or phenyl.

30. The organosilane compound of claim 26, wherein in formula (1), Y is a C$_2$-C$_{30}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is C$_1$-C$_4$ alkyl or phenyl.

31. The organosilane compound of claim 27, wherein in formula (1), Y is a C$_2$-C$_{30}$ alkylene group which may contain a divalent group selected from the group consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is C$_1$-C$_4$ alkyl or phenyl.

32. The organosilane compound of claim 24, wherein in formula (1), X is each independently selected from the group consisting of hydroxyl, methoxy, ethoxy, isopropenoxy and chlorine.

33. The organosilane compound of claim 25, wherein in formula (1), X is each independently selected from the group consisting of hydroxyl, methoxy, ethoxy, isopropenoxy and chlorine.

34. The organosilane compound of claim 26, wherein in formula (1), X is each independently selected from the group consisting of hydroxyl, methoxy, ethoxy, isopropenoxy and chlorine.

35. The organosilane compound of claim 27, wherein in formula (1), X is each independently selected from the group consisting of hydroxyl, methoxy, ethoxy, isopropenoxy and chlorine.

36. The organosilane compound of claim 23, having the formula (2):

[Chem. 2]

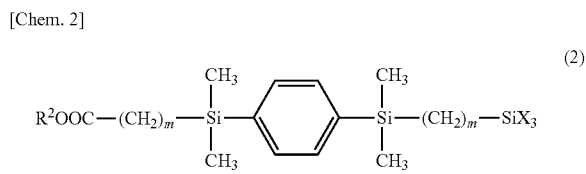

wherein R$^1$ is a C$_1$-C$_{20}$ alkyl group, C$_6$-C$_{20}$ aryl group or C$_7$-C$_{20}$ aralkyl group, m is each independently an integer of 2 to 20, and X is independently a group as defined above.

37. A surface treating agent comprising at least one selected from the group consisting of at least one organosilane compound of claim 23, a partial condensate thereof and a partial hydrolytic condensate thereof.

38. A surface treating agent comprising at least one selected from the group consisting of at least one organosilane compound of claim 24, a partial condensate thereof and a partial hydrolytic condensate thereof.

39. A surface treating agent comprising at least one selected from the group consisting of at least one organosilane compound of claim 25, a partial condensate thereof and a partial hydrolytic condensate thereof.

40. A surface treating agent comprising at least one selected from the group consisting of at least one organosilane compound of claim 26, a partial condensate thereof and a partial hydrolytic condensate thereof.

41. A surface treating agent comprising at least one selected from the group consisting of at least one organosilane compound of claim 27, a partial condensate thereof and a partial hydrolytic condensate thereof.

* * * * *